(12) United States Patent  (10) Patent No.: US 6,249,689 B1
Aizawa                     (45) Date of Patent:    Jun. 19, 2001

(54) PORTABLE RADIO INFORMATION TERMINAL APPARATUS, SCREEN OPERATING METHOD, STORAGE MEDIUM, AND INFORMATION PROCESSING APPARATUS

(75) Inventor: Masatoshi Aizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/219,841

(22) Filed: Dec. 23, 1998

(30) Foreign Application Priority Data

Dec. 25, 1997 (JP) .................................................... 9-356496

(51) Int. Cl.$^7$ ................................ H04B 1/38; G06F 3/00; G09G 5/34
(52) U.S. Cl. ............................ 455/566; 345/341; 345/123
(58) Field of Search ...................... 455/566, 550, 455/575, 90, 556; 345/341, 973, 123, 125, 121, 204; 340/825.44, 10.6, 311.1

(56) References Cited

U.S. PATENT DOCUMENTS 5,872,521 * 2/1999 Lopatukin et al. .............. 340/825.44
5,936,618 * 10/1999 Spiero et al. ......................... 345/204
6,125,287 * 9/2000 Cushman et al. ..................... 455/566

* cited by examiner

Primary Examiner—Tracy Legree
(74) Attorney, Agent, or Firm—Jay H. Maioli

(57) ABSTRACT

A screen operating method for use with a portable radio information terminal apparatus having an input device for allowing commands to be inputted and an image display device for displaying screens. The apparatus is capable of displaying on a screen a message received on radio waves. The screen operating method includes the steps of: establishing a scroll unit as a unit amount by which to effect a single scroll operation in accordance with an information class attached to the received message; establishing a scrolling direction based on an input command; and performing scrolling in the established scroll unit and in the established scrolling direction.

6 Claims, 14 Drawing Sheets

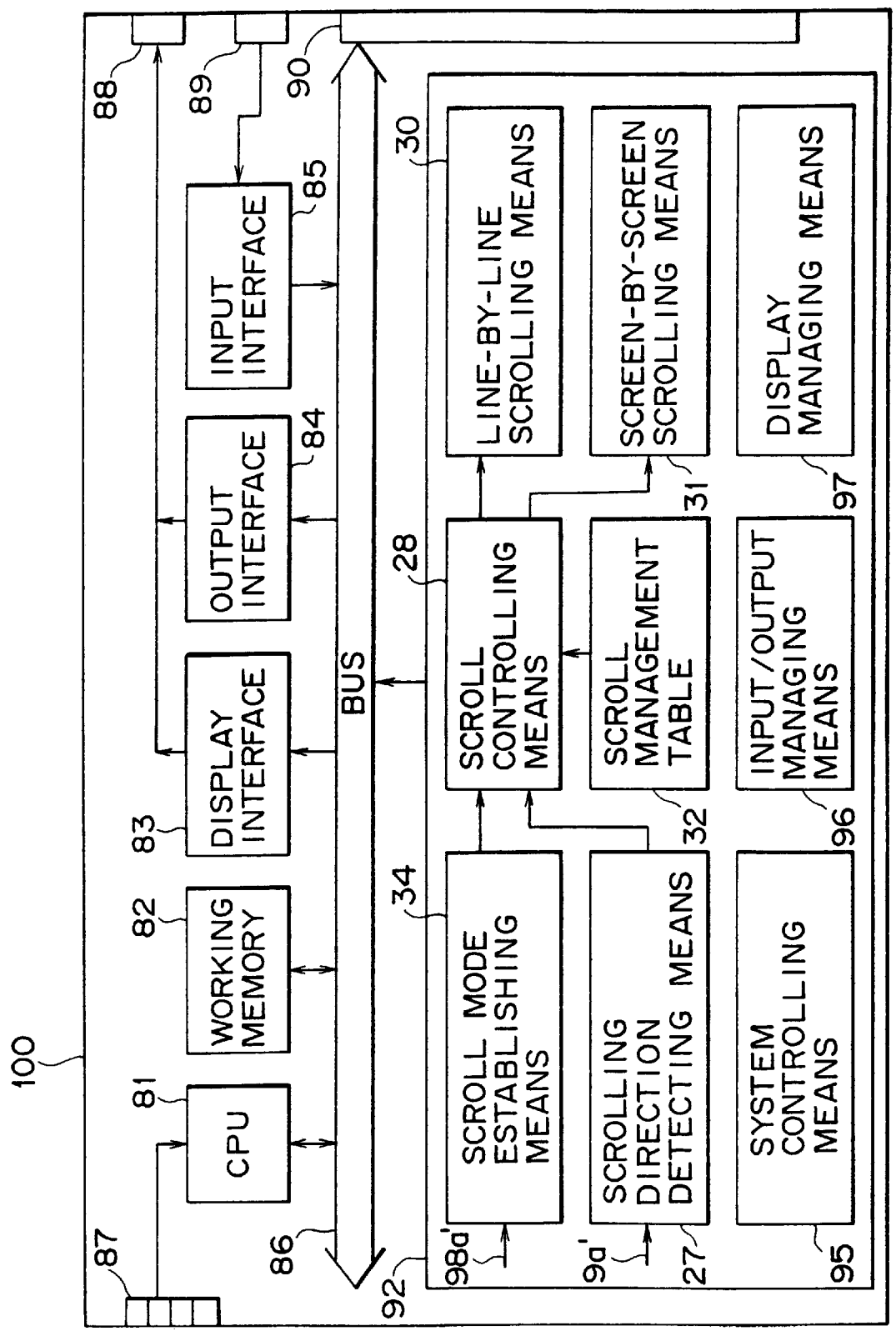

PORTABLE RADIO INFORMATION TERMINAL APPARATUS, SCREEN OPERATING METHOD, STORAGE MEDIUM, AND INFORMATION PROCESSING APPARATUS

BACKGROUND OF THE INVENTION

The present invention relates to a portable radio information terminal apparatus and a screen operating method for use therewith. More particularly, the invention relates to a portable radio information terminal apparatus implemented as a pager and a screen operating method for use therewith, the pager receiving message information that is displayed and scrolled on a screen by that method.

There exist portable radio information terminal apparatuses each serving as a terminal apparatus of a communication network. They have been commercialized with diverse structures and functions that meet today's varied and rapidly expanding demands in the field of telecommunications.

One typical portable radio information terminal apparatus that has gained widespread use is the so-called pager for receiving radio signals. In its infancy, the pager was a terminal that beeped upon receipt of a call signal from a radio station. Typically, a user carrying such a pager would be in a location away from wired telephones. On receiving a radio call signal issued by someone via a radio station, the pager alerted the user to call back from the nearest wired telephone.

Then came a new generation of pagers capable of receiving not only simple call signals but also signals containing informations via radio stations. The type of pager used extensively today is one which, upon receipt of a message-carrying signal, decodes the signal and places decoded message information and related data into a memory while simultaneously displaying the received message on a liquid crystal display panel.

The above type of pager decodes messages from the incoming signals and organizes the decoded messages into suitable message files. These messages are stored in a message memory as organized in such message files.

On a single screen of a built-in liquid crystal display panel, a message body is displayed illustratively in four lines of 20 characters each. If the message body has more than four lines, the user may perform necessary input operations to scroll the screen to view the entire message successively.

With an expanding scope of applications for the above type of portable radio information terminal apparatus have come varieties of messages that may be received by the terminal. For example, the messages received from individuals which are the most prevalent kind of messages have been supplemented by growing volumes of message information originating from businesses and organizations offering message information services.

These different kinds of received information may be classified by message format. For example, bodies of messages from individuals are mostly composed of character symbols. On the other hand, message information from information service businesses may be made up not only of character symbols but also of dot-pattern-based graphics.

Given such diversity of received messages, it is preferable that a unit amount of screen scroll, i.e., the unit extent of screen space in which the screen is scrolled by each scroll operation, is varied depending on the format of each received message. Most conventional portable radio information terminal apparatuses, however, have only offered a screen scrolling function that scrolls the screen by one character line every time a screen scrolling operation is carried out.

Consequently, although the line-by-line scrolling feature is advantageous in scrolling graphic images such as maps and weather patterns, users of the prior-art terminal apparatuses have had to perform many scrolling operations in a limited time when reading certain types of messages. Such messages include the one whose body is composed of numerous lines that must be read successively and rapidly by the user, and the one that needs to be fast forwarded so that a latter part of it will be displayed quickly for preferential reading.

The conventional apparatuses have thus suffered from poor operability; the repeated operations are tiresome for users and are prone to errors. In addition, the message read-out process by users has tended to be a time-consuming chore.

SUMMARY OF THE INVENTION

It is therefore an object of the present invention to overcome the above and other deficiencies and disadvantages of the prior art and to provide a portable radio information terminal apparatus and a screen operating method for use therewith, the apparatus and the method allowing a unit amount of scroll on a display screen to be varied as desired.

In carrying out the invention and according to a first aspect thereof, there is provided a screen operating method for use with a portable radio information terminal apparatus having inputting means and image displaying means for displaying screens, the apparatus being capable of screen displays. The screen operating method comprises the steps of: establishing a scroll unit as a unit amount by which to effect a single scroll operation in accordance with an information class attached to a received message; establishing a scrolling direction based on an input command; and performing scrolling in the established scroll unit and in the established scrolling direction.

With the above inventive method in use, the unit amount by which to effect a single upward or downward scroll operation is changed in accordance with the information class attached to the received message. The method thus makes it possible to scroll graphics of dot patterns in a small scrolling amount and to fast forward or rewind displays as needed, whereby efficient and application-specific scrolling is provided.

According to a second aspect of the invention, there is provided a portable radio information terminal apparatus comprising: inputting means; image displaying means; information class extracting means for extracting an information class attached to a received message; scrolling direction detecting means for detecting a scrolling direction according to an input signal; and scroll controlling means for controlling scrolling in the detected scrolling direction and in a scroll unit corresponding to the extracted information class.

Therefore, the above-mentioned means constitute the inventive apparatus that effectively extracts an information class, detects a scrolling direction, establishes a scroll unit for a single scroll operation, and performs scrolling in the detected scrolling direction and in the established scroll unit.

According to a third aspect of the invention, there is provided a storage medium for use with a portable radio information terminal apparatus having inputting means and image displaying means. The storage medium stores programs which may be read and executed by a computer during an operation of the terminal apparatus. The programs include: information class extracting means for extracting an information class attached to a received message; scrolling direction detecting means for detecting a scrolling direction based on an input signal; and scroll controlling means for controlling scrolling in the detected scrolling direction and in scroll unit corresponding to the extracted information class.

The inventive storage medium above is incorporated as a memory accommodating CPU operating procedures into a portable radio information terminal apparatus which comprises a CPU, inputting means, image displaying means and a message memory. When the storage medium is installed as described, the means stored therein are executed consecutively by the CPU as the operating procedures. The storage medium thus provides the terminal apparatus with capabilities for extracting an information class, detecting a scrolling direction, ascertaining a scroll unit for a single scroll operation, and performing scrolling in the desired direction and in the designated scroll unit. As such, the storage medium above helps implement a portable radio information terminal apparatus that offers the varied functions stated above.

According to a fourth aspect of the invention, there is provided an information processing apparatus comprising a storage part for storing steps which may be read and executed by a CPU in the form of programs during an operation of a portable radio information terminal apparatus for use with the information processing apparatus. The apparatus comprises inputting means and image displaying means and is capable of displaying on a screen a message received over radio waves. The programs in the storage part of the information processing apparatus include: information class extracting means for extracting an information class attached to the received message; scrolling direction detecting means for detecting a scrolling direction based on an input signal; and scroll controlling means for controlling scrolling in the detected scrolling direction and in a scroll unit corresponding to the extracted information class.

Consequently, the inventive information processing apparatus above is combined with a communication facility, a received message memory, inputting means, image displaying means, and a power supply circuit to constitute a portable radio information terminal apparatus. The information processing apparatus provides the terminal apparatus with capabilities for extracting an information class, detecting a scrolling direction, ascertaining a scroll unit for a single scroll operation, and performing scrolling in the determined scroll unit and in the desired direction. As such, the above information processing apparatus helps implement with ease a simply structured portable radio information terminal apparatus offering the varied functions stated above.

According to a fifth aspect of the invention, there is provided a screen operating method for use with a portable radio information terminal apparatus having inputting means and image displaying means. The method comprises the steps of: establishing a scroll mode on the basis of an input command; establishing a scroll unit in accordance with the established scroll mode; establishing a scrolling direction based on another input command; and performing scrolling in the established scroll unit and in the established scrolling direction.

With the inventive method above in use, scrolling can be performed in the input-designated scroll unit and in the input-specified scrolling direction. Because the user can operate screen displays in the desired scroll unit, different kinds of displayed information may be scrolled in suitably different scroll units. This appreciably enhances the operability of the terminal apparatus.

According to a sixth aspect of the invention, there is provided a portable radio information terminal apparatus comprising: inputting means; image displaying means; scroll mode establishing means for establishing a scroll mode on the basis of an input signal; scrolling direction detecting means for detecting a scrolling direction based on another input signal; and scroll controlling means for controlling scrolling in the detected scrolling direction and in the scroll unit corresponding to the established scroll mode.

Therefore the above-mentioned means constitute the inventive apparatus that effectively establishes the input-designated scroll mode, detects the input-specified scrolling direction, and performs scrolling in the desired scrolling direction and in the desired scroll unit. The user can scroll different kinds of displayed information in suitably different scroll units, whereby the operability of the terminal apparatus is boosted significantly.

According to a seventh aspect of the invention, there is provided a storage medium for use with a portable radio information terminal apparatus having inputting means and image displaying means. The storage medium stores programs which may be read and executed by a computer during an operation of the terminal apparatus. The programs include: scroll mode establishing means for establishing a scroll mode on the basis of an input signal; scrolling direction detecting means for detecting a scrolling direction based on another input signal; and scroll controlling means for controlling scrolling in the detected scrolling direction and in the scroll unit corresponding to the established scroll mode.

The inventive storage medium above is incorporated as a memory accommodating CPU operating procedures into a portable radio information terminal apparatus which comprises image displaying means and inputting means. When the storage medium is installed as described, the means stored therein are executed consecutively by the CPU as the operating procedures. The storage medium thus provides the terminal apparatus with capabilities for establishing the input-designated scroll mode, detecting the input-specified scrolling direction, and performing scrolling in the desired scrolling direction and in the scroll unit corresponding to the scroll mode.

According to an eighth aspect of the invention, there is provided an information processing apparatus comprising a storage part for storing steps which may be read and executed by a CPU in the form of programs during an operation of a portable radio information terminal apparatus. The apparatus has inputting means and image displaying means and is for use with the information processing apparatus. The programs in the storage part of the information processing apparatus include: scroll mode establishing means for establishing a scroll mode on the basis of an input signal; scrolling direction detecting means for detecting a scrolling direction based on another input signal; and scroll controlling means for controlling scrolling in the detected scrolling direction and in the scroll unit corresponding to the established scroll mode.

The inventive information processing apparatus above is combined with a communication facility, a received message memory, inputting means, image displaying means, a power supply circuit and so on, to constitute a portable radio information terminal apparatus. The information processing apparatus provides the terminal apparatus with capabilities for establishing the input-designated scroll mode, detecting the input-specified scrolling direction, and performing scrolling in the desired scrolling direction and in the scroll unit corresponding to the scroll mode. As such, the above information processing apparatus helps implement with ease a simply structured portable radio information terminal apparatus offering the varied functions stated above.

In a preferred variation of the screen operating method for use with the portable radio information terminal apparatus according to the first or the fifth aspect of this invention, the inputting means may include a rotary input device capable of generating two kinds of input signals when a rotating part of that rotary input device is rotated clockwise and counterclockwise. The preferred method above allows a limited number of operations of input devices to generate a plurality of input signals. This helps simplify necessary operations of the terminal apparatus.

In a preferred structure of the portable radio information terminal apparatus according to the second or the sixth aspect of this invention, the inputting means may also include a rotary input device capable of generating two kinds of input signals when a rotating part of that rotary input device is rotated clockwise and counterclockwise. Thus, the preferred terminal apparatus comprises a smaller number of input devices than before, whereby the apparatus size is reduced correspondingly.

Other objects, features and advantages of the invention will become more apparent upon a reading of the following description and appended drawings.

BRIEF DESCRIPTION OF THE DRAWINGS

FIG. 15 is a block diagram of an information processing apparatus practiced as a sixth embodiment of this invention.

DESCRIPTION OF THE PREFERRED EMBODIMENTS

Preferred embodiments of this invention will now be described in detail with reference to the accompanying drawings. It is to be understood that although the description below contains many technically advantageous specificities, these should be construed, unless otherwise noted, not as limiting the scope of the invention but as merely providing illustrations of the presently preferred embodiments of this invention.

Figure 1:
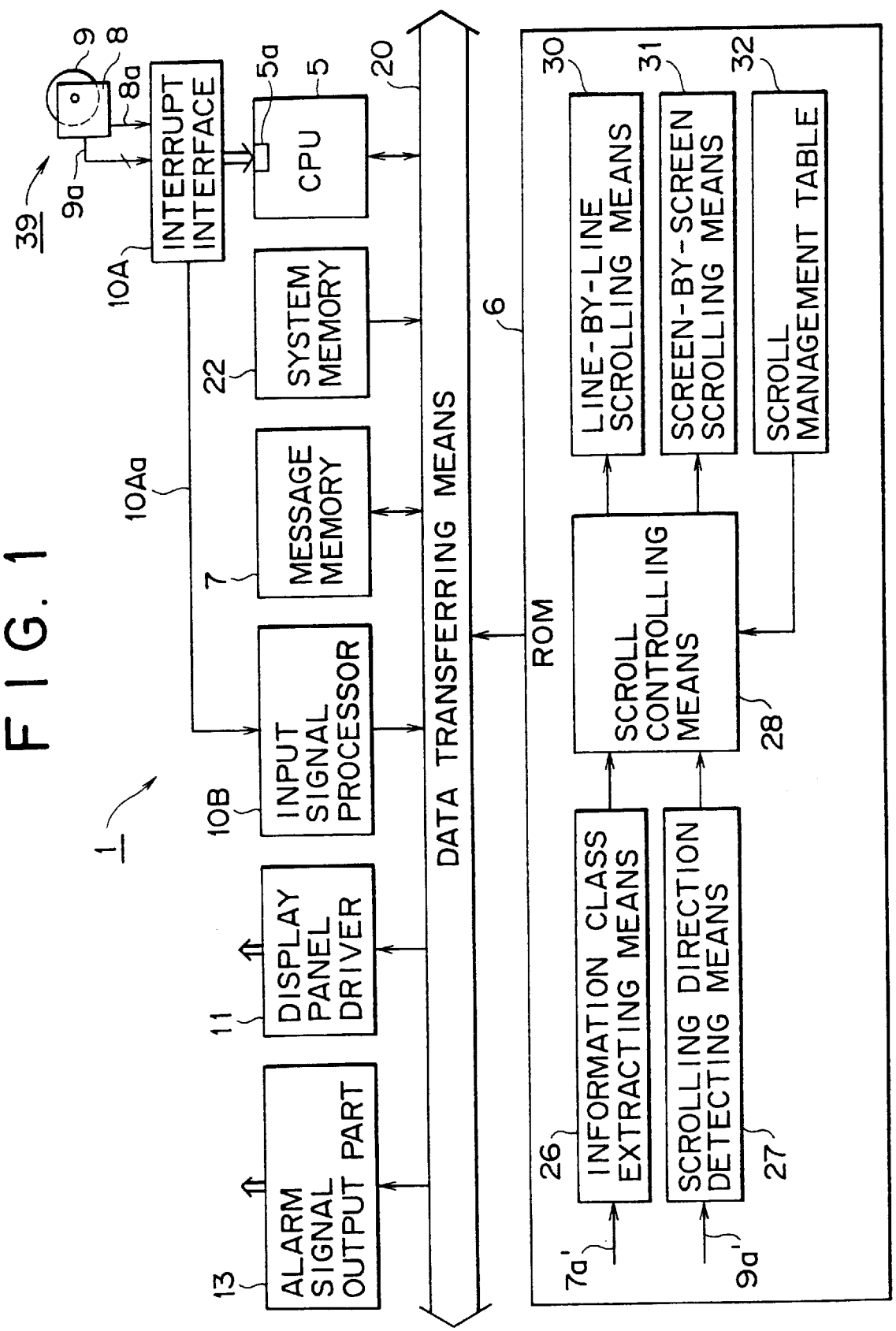
FIG. 1 is a block diagram showing a partial constitution of a portable radio information terminal apparatus practiced as a first embodiment of this invention.
Figure 2:
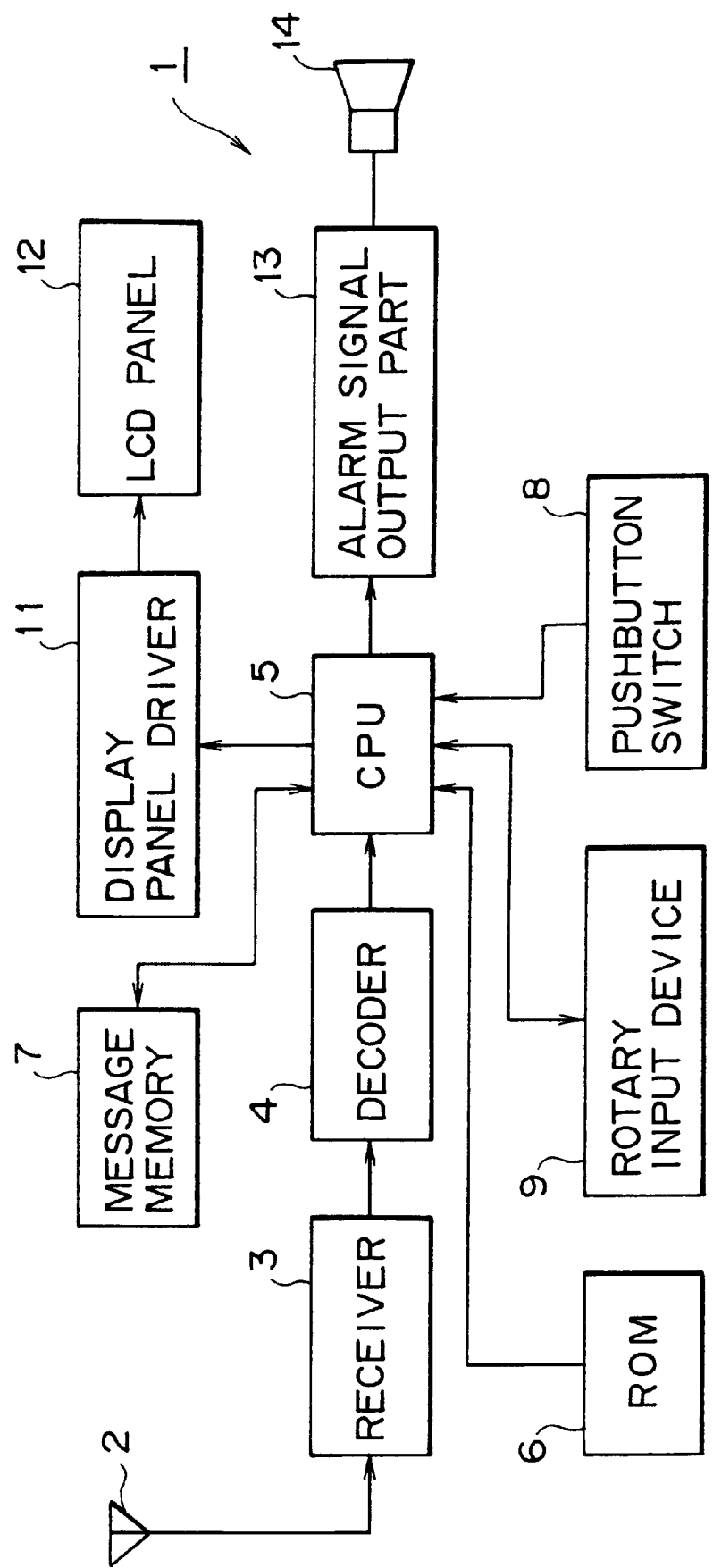
FIG. 2 is a block diagram depicting an overall constitution of the first embodiment in FIG. 1.
Figure 3:
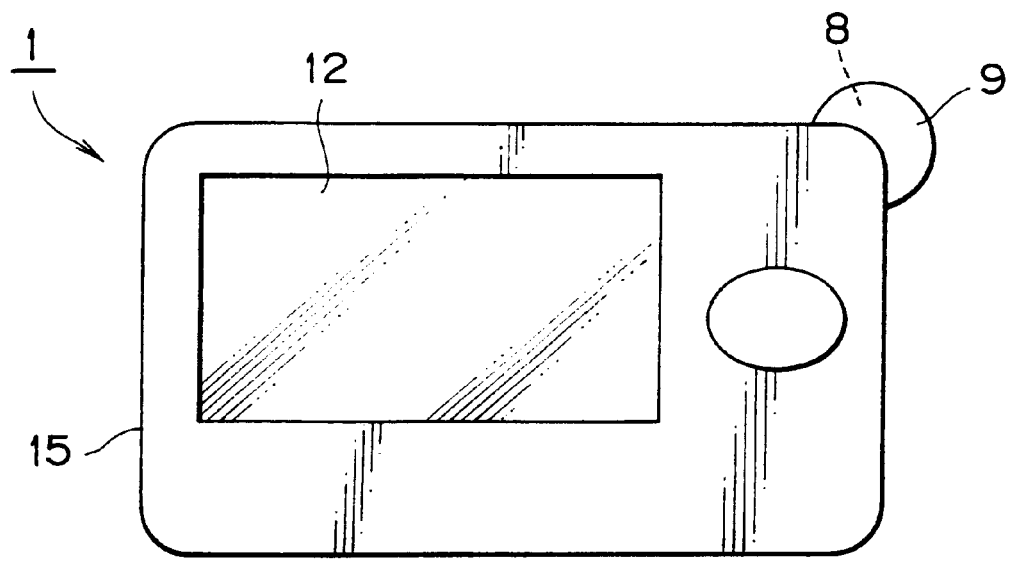
FIG. 3 is a front view of the portable radio information terminal apparatus shown as the first embodiment in FIGS. 1 and 2.

FIG. 1 is a block diagram showing a partial constitution of a portable radio information terminal apparatus implemented as the first embodiment of this invention. FIG. 2 is a block diagram depicting an overall constitution of the apparatus in FIG. 1. FIG. 3 is a front view of the apparatus. Below is a description of the overall constitution of the first embodiment with reference to FIGS. 2 and 3, followed by more details about its key components with reference to FIG. 1.

The portable radio information terminal apparatus practiced as the first embodiment of the invention constitutes specifically a pager. As shown in FIG. 2, the pager 1 comprises an antenna 2, a receiver 3 and a decoder 4 making up communicating means of the apparatus. The antenna 2 receives radio waves carrying information signals from a transmitting base such as a radio station located in remote areas. The receiver 3 is connected to the antenna 2, and detects and amplifies a signal received by the antenna 2. The decoder 4 is connected to the receiver 3, and decodes coded information out of the received signal.

The decoder 4 has an A/D converter that generates digital information. Another function of the decoder 4 matches an ID code held in an ID memory (not shown) such as an EEPROM against the decoded information to verify whether the transmitted information is destined for the particular apparatus. An output side of the decoder 4 is connected to a CPU 5.

The CPU 5 is also connected to a message memory 7 illustratively made of an SRAM as well as to a ROM (read only memory) 6. The ROM 6 may be constituted by a read-only MOS memory or a flash memory containing procedures for screen scrolls and for other application-related operations. These procedures are stored in the ROM 6 in the form of programs executable by the CPU 5.

The CPU 5 controls data processing and input/output operations. The CPU 5 controls and manages operations of the entire apparatus 1 according to various executable procedures (programs) held in the ROM 6 and in a system memory. These operations under control and management of the CPU 5 include receiving and handling input signals from an input device (to be described later), writing data to the message memory 7 and organizing message files therein, retrieving messages from any of the files, displaying message information onto a display screen, and alerting the reception of incoming signals to the users as well as errors such as an abnormal voltage.

Message information generated in the decoded information from the decoder 4 according to the received signal, is written into the message memory 7 for storage therein. The stored message information is read from the memory and displayed onto the display screen. Instead of the SRAM mentioned above, a nonvolatile memory such as a flash memory or an EEPROM may alternatively constitute the message memory 7.

As inputting means operable by the user, a rotary/pushing input device 39 is attached to the pager 1. The rotary/pushing input device 39 is composed of a rotary input device 9 and a pushbutton switch 8 formed integrally. The rotary input device 9 is used to scroll the screen. The rotary/pushing input device 39 will be described later in more detail.

The rotary input device 9 and the pushbutton switch 8 are connected to an input device controller 10. The controller 10 is in turn connected to the CPU 5.

The CPU 5 is also connected to a display panel driver 11. A liquid crystal display (LCD) panel 12 is connected as a display screen to the display panel driver 11. The display panel driver 11 and LCD panel 12 make up image displaying means of the first embodiment.

A display signal output by the CPU 5 is sent to the display panel driver 11. Given the display signal, the display panel driver 11 inputs a drive signal to the LCD panel 12 to drive the latter and to generate a screen thereon.

The CPU 5 is further connected to an alarm signal output part 13 which in turn is connected to a speaker 14 acting as an alerting device. The CPU 5 outputs an alarm activation signal that is input to the alarm signal output part 13 whereby the signal is converted to an audio signal driving the speaker 14.

The portable radio information terminal apparatus practiced as the first embodiment of this invention has an appearance shown in FIG. 3. As illustrated, the inventive apparatus 1 is housed in a thin, rectangular cabinet 15. In the approximate middle of the front of the cabinet 15 is the liquid crystal display (LCD) panel 12 that gives message, date and time-of-day indications.

The rotary/pushing input device 39 embodying push inputting means is attached to the top right corner of the cabinet 15, the device 39 being partially projected outwardly from the cabinet 15. The push inputting means has a knob representing the rotary input device 9 that may be rotated clockwise or counterclockwise as desired.

Further the pushbutton switch 8 is formed integrally with the rotary input device 9. Pushing the knob of the rotary input device 9 activates the pushbutton switch 8.

Figure 4:
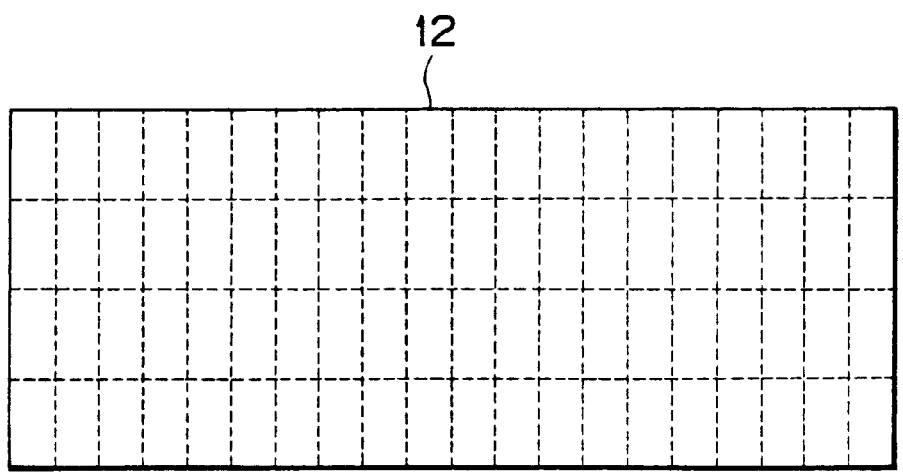
FIG. 4 is an explanatory view of a typical display on the first embodiment of the portable radio information apparatus in FIG. 3.

The LCD panel 12 has a display screen that gives an alphabetic or numeric indication in four lines of 20 characters each, as shown in FIG. 4. The display screen displays messages in alphanumeric characters or graphics in dot patterns.

Key components of the portable radio information terminal apparatus 1 embodying the invention will now be described in detail with reference to FIG. 1. As illustrated, data transferring means 20 is a data bus to which are connected the CPU 5, a system memory 22, the ROM 6, the message memory 7, an input signal processor 10B, the display panel driver 11, and the alarm signal output part 13.

In that connective arrangement, the CPU 5 exchanges data via the data transferring means 20 with the system memory 22, ROM 6, message memory 7, display panel driver 11, alarm signal output part 13, and input signal processor 10B.

The system memory 22 contains, in the form of programs executable by the CPU 5, procedures for controlling operations of the inventive apparatus as a whole. The operations thus controlled include adding, deleting and locking information and data in the apparatus.

The CPU 5 has an interrupt terminal 5a that is connected through an interrupt interface 10A to the rotary/pushing input device 39 acting as the inputting means of the apparatus. An output of the interrupt interface 10A is also connected to the input signal processor 10B.

Figure 5:
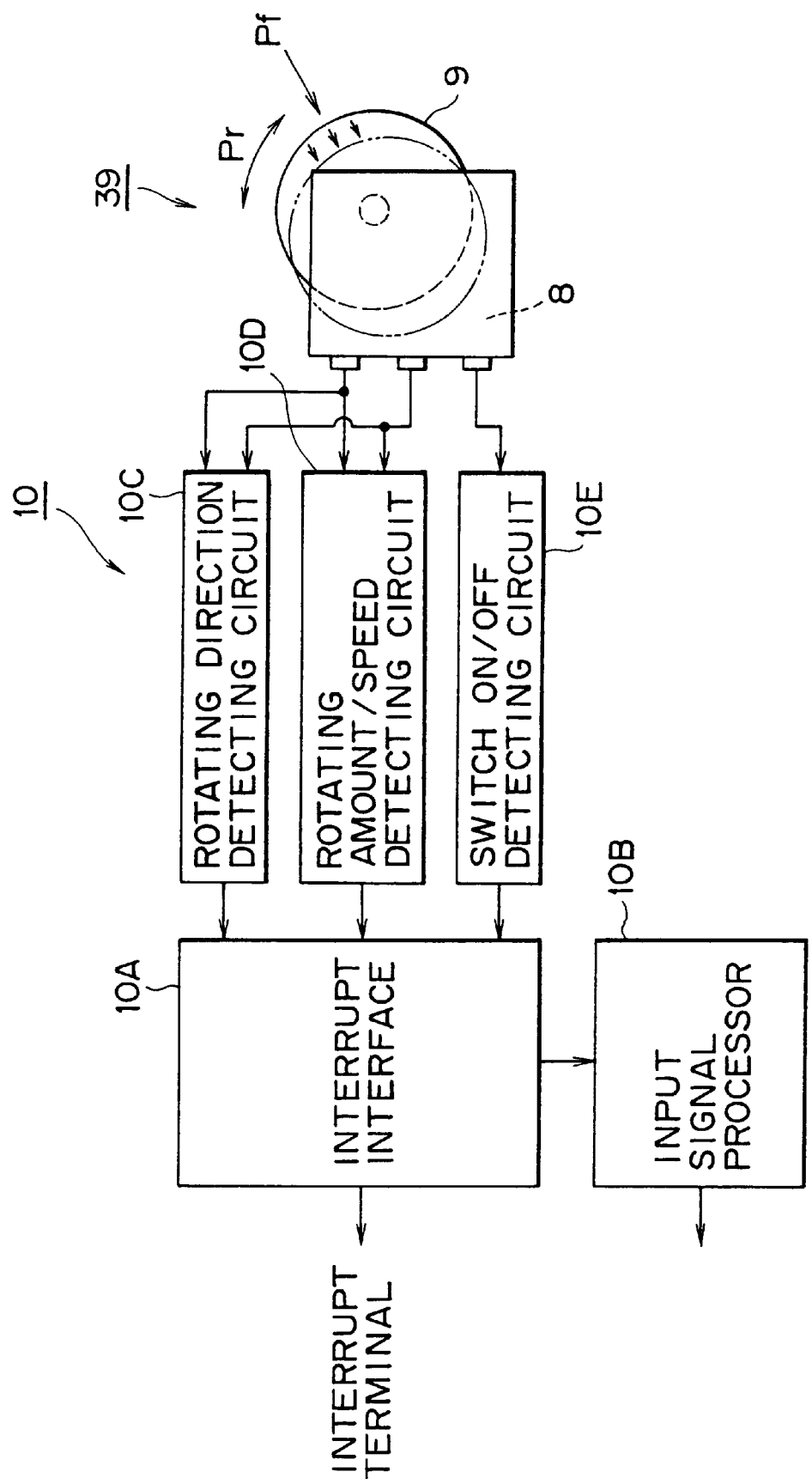
FIG. 5 is a block diagram of a rotary/pushing input device for use with the first embodiment.

FIG. 5 is a block diagram of the rotary/pushing input device 39 as the inputting means of the first embodiment. As illustrated, the rotary/pushing input device 39 is made up of the rotary input device 9 and pushbutton switch 8 formed integrally. The rotary input device 9 serves as a rotary operation part and the pushbutton switch 8 as a pushing operation part.

The rotary/pushing input device 39, implemented typically as push inputting means or a rotary encoder, contributes to scaling down the size of the portable radio information terminal apparatus and to minimizing the number of its component parts. The rotary operation part is a disk-like knob that is rotated freely, and the pushing operation part generates intermittent signals when the entire knob is pressed in.

The disk-like knob is turned clockwise or counterclockwise to generate two kinds of input signal. These signals may be used to designate directions for scrolling the screen. Consequently, a single rotary input device 9 when rotated provides commands for both upward and downward screen scrolls.

Pushing the disk-like knob provides another function of providing intermittent input signals. By replacing a dedicated switch for the intermittent signal entry, the knob with its multiple functions contributes to reducing the number of component parts used. This helps scale down the size of the apparatus and improve its operability.

The rotary input device 9 has the knob that may be rotated freely in arrowed direction Pr (FIG. 5). Turning the knob clockwise or counterclockwise causes the device to generate a signal 9a at its terminals corresponding to the rotating direction.

Pushing the knob in an arrowed direction Pf (FIG. 5) moves the pushbutton switch 8 in strokes. Thus, motion generates a signal 8a intermittently at the terminals of the device. The signal is called an intermittent input signal 8a.

Information about the rotating direction of the knob on the rotary input device 9 is inputted to the interrupt interface 10A as a signal that is obtained by a rotating direction detecting circuit 10C (part of the input device controller 10) from the terminals of the device. Given the input information, the interrupt interface 10A generates an interrupt signal correspondingly. At the same time, the interrupt interface 10A creates a signal 10Aa (FIG. 1) bearing the information about the rotating direction of the knob, and inputs the signal 10Aa to the input signal processor 10B.

On receiving the signal 10Aa, the input signal processor 10B forwards the signal either immediately or after holding it for output onto the data transferring means 20. The information is accepted when means for determining the rotating direction of the rotary input device (software held in the system memory 22, not shown) is to be executed.

As mentioned above, when the input signal processor 10B outputs the signal 10Aa immediately without holding it, the information about the rotating direction of the knob is utilized only once. That is, one knob operation corresponds to one process.

On the other hand, when the input signal processor 10B outputs the signal 10Aa after holding it, the information about the rotating direction of the knob may be used repeatedly. That is, while the knob is being rotated continuously, the process is repeated.

Alternatively, as illustrated in FIG. 5, a rotating amount/speed detecting circuit 10D (another part of the input device controller 10) may send to the interrupt interface 10A a signal acquired from the terminals of the device representing information about the rotating amount and speed of the knob on the rotary input device 9. The signal may be accepted in a subsequent process.

The intermittent input signal 8a generated by the pushbutton switch 8 is acquired as another signal from the terminals of the device by a switch on/off detecting circuit 10E (another part of the input device controller 10). The signal is inputted likewise to the interrupt interface 10A.

The rotary input device 9 and pushbutton switch 8 are structured so that each of them may be operated separately. The two components may also be operated at the same time to effect simultaneous inputs.

As described, the rotary input device 9 which is a part of the rotary/pushing input device 39, serves as a device to enter commands representing most of the operation control signals including those for scrolling displayed screens and selecting a specific field on a screen. The pushbutton switch 8 acts as a signal input device used to determine a selected field or displayed numerics as well as to shift the apparatus from one operation mode to another.

Because the rotary/pushing input device 39 as a single entity is capable of generating a plurality of input signals, it replaces a plurality of conventional, single-function discrete switches. Such arrangement helps to reduce the space occupied by the switches of the apparatus.

The rotary input signal 9a or the intermittent input signal 8a coming respectively from the rotary input device 9 or the pushbutton switch 8 passes through the interrupt interface 10A to become an interrupt signal. The interrupt signal is admitted to the CPU 5 through its interrupt receiving terminal.

In the above setup, operating at least either the rotary input device 9 or the pushbutton switch 8 generates at least the rotary input signal 9a or the intermittent input signal 8a. The signal thus generated causes the interrupt interface 10A to input an interrupt signal to the CPU 5. The interrupt signal brings the CPU 5 into an interrupt handling phase.

Figure 6:
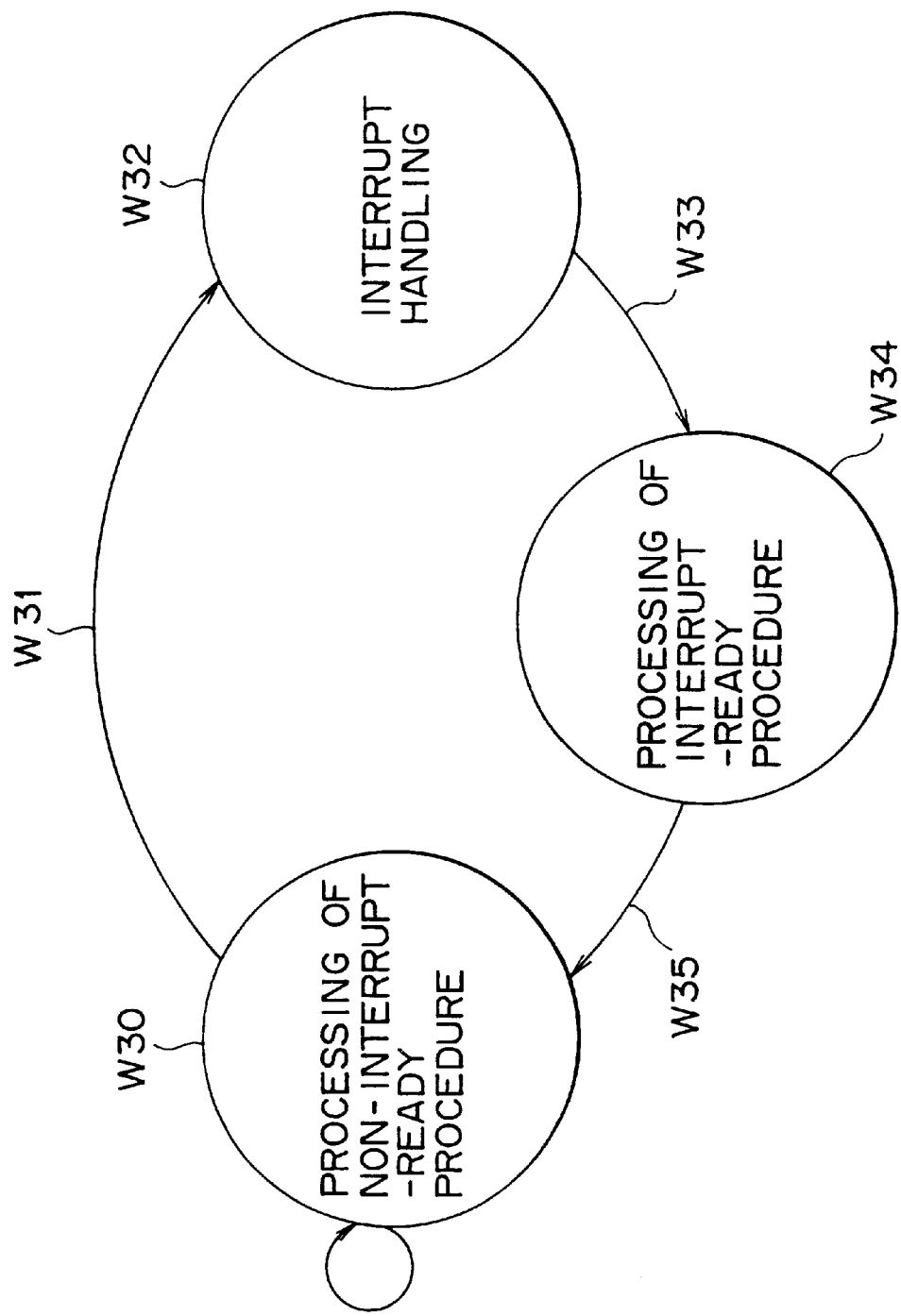
FIG. 6 is a transition diagram showing typical transitions in handling interruptions generated by an input device.

FIG. 6 is a transition diagram showing typical transitions in handling interruptions generated by an input device. Initially, the CPU 5 is in a state W30 of non-interrupt-ready procedure processing. After detecting an interrupt W31 upon receipt of an interrupt signal, the CPU 5 executes an interrupt signal handling procedure held in the system memory 22 to handle the interrupt signal in a state W32.

The input device that has generated the interrupt is specified at this point in one of two ways: the way directly from the interrupt receiving terminal, or the way of forwarding an input signal 10Aa to the input signal processor 10B through the interrupt interface 10A.

In identifying the input device having generated an interrupt, it is possible to ascertain simultaneous inputs from a plurality of input devices. Illustratively, if a plurality of input devices are operated concurrently, an interrupt W31 is accepted only from one of these devices which generates the interrupt signal first. That a queuing list is referenced in the state W32 of interrupt handling, however, makes it possible to verify the simultaneous inputs originating from the multiple devices.

Once the input device having issued the interrupt is identified (i.e., the device operated by the user), an interrupt-ready procedure corresponding to the input device in question is retrieved from the system memory 22 during a transition W33. This brings about a state W34 of interrupt-ready procedure processing. When input values or other data from the input device have been determined during a transition W35, interrupt handling is completed. The CPU 5 then returns to the state W30 of non-interrupt-ready procedure processing. From that point onward, the input values from the input device become usable.

Various means stored in the ROM 6 will now be described by referring back to FIG. 1. As illustrated, the ROM 6 contains information class extracting means 26, scrolling direction detecting means 27, scroll controlling means 28, line-by-line scrolling means 30, and screen-by-screen scrolling means 31, all provided as procedures (programs) executable by the CPU 5. Also included in the ROM 6 is a scroll management table 32 that may be referenced by the CPU 5.

The information class extracting means 26, when executed, extracts an information class CL (see FIG. 8) from a received message 7a'.

The scrolling direction detecting means 27 is used to detect a scrolling direction of the screen on the basis of an input signal 9a' coming from the rotary input device 9.

The scroll controlling means 28 furnishes the line-by-line scrolling means 30 or the screen-by-screen scrolling means 31 with commands according to both the extracted information class designating the unit amount of scroll and the detected scrolling direction. Given the command, the scrolling means 30 or 31 executes scrolling of the screen in the scroll unit and in the designated scrolling direction.

The line-by-line scrolling means 30 scrolls one line at a time in receiving a suitable command from the scroll controlling means 28. That is, the scrolling means 30 is activated when the designated unit amount of scroll has turned out to be a line.

The screen-by-screen scrolling means 31 scrolls one screen at the time when it receives an appropriate command from the scroll controlling means 28. That is, the scrolling means 31 is operated when the designated unit amount of scroll is found to be a screen.

The above-described means are all stored as programs executable either directly or indirectly. Preferably, the programs are addressed in an absolute binary format. Alternatively, the programs may be written in a relocatable binary format that requires readdressing upon execution. In the latter case, it is necessary to make linkage means reside illustratively, for example, in the system memory 22.

Figure 7:
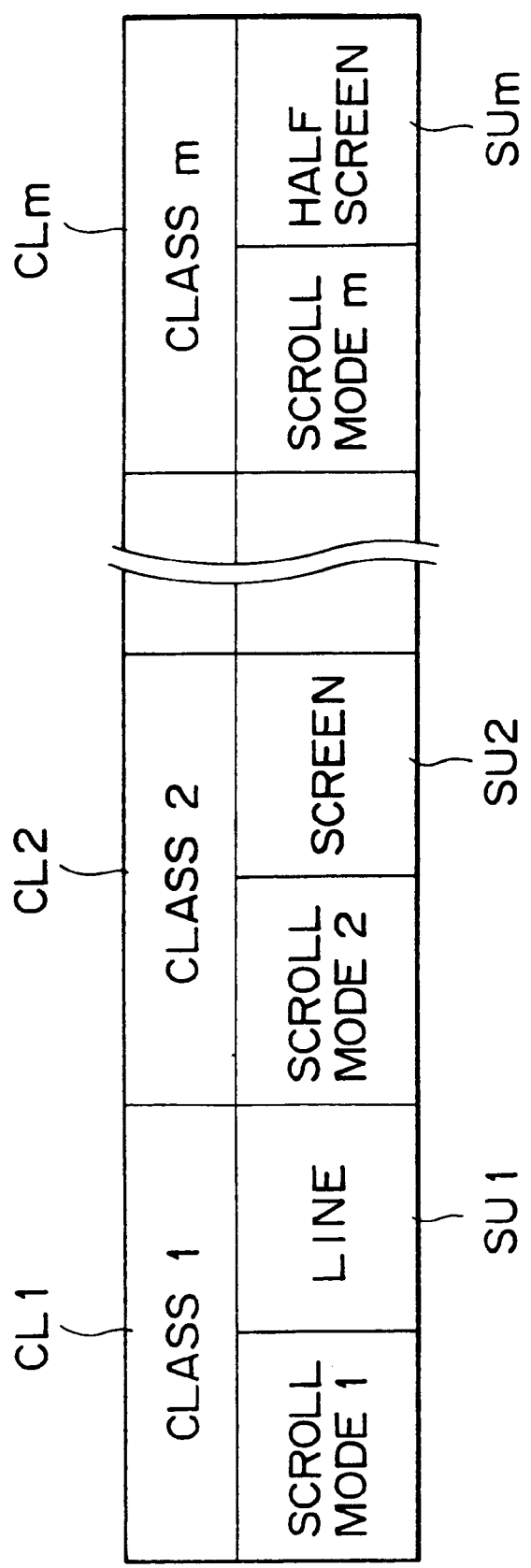
FIG. 7 is an explanatory view of a scroll management table.

As shown in FIG. 7, the scroll management table 32 defines a scroll mode and a unit amount of scroll for each of different information classes. With the first embodiment, a scroll unit SUI for a first class CL1 is defined as a line; a scroll unit SU2 for a second class CL2 is defined as a screen; and a scroll unit SUm for an m-th class CLm is defined as a half screen.

Figure 9:
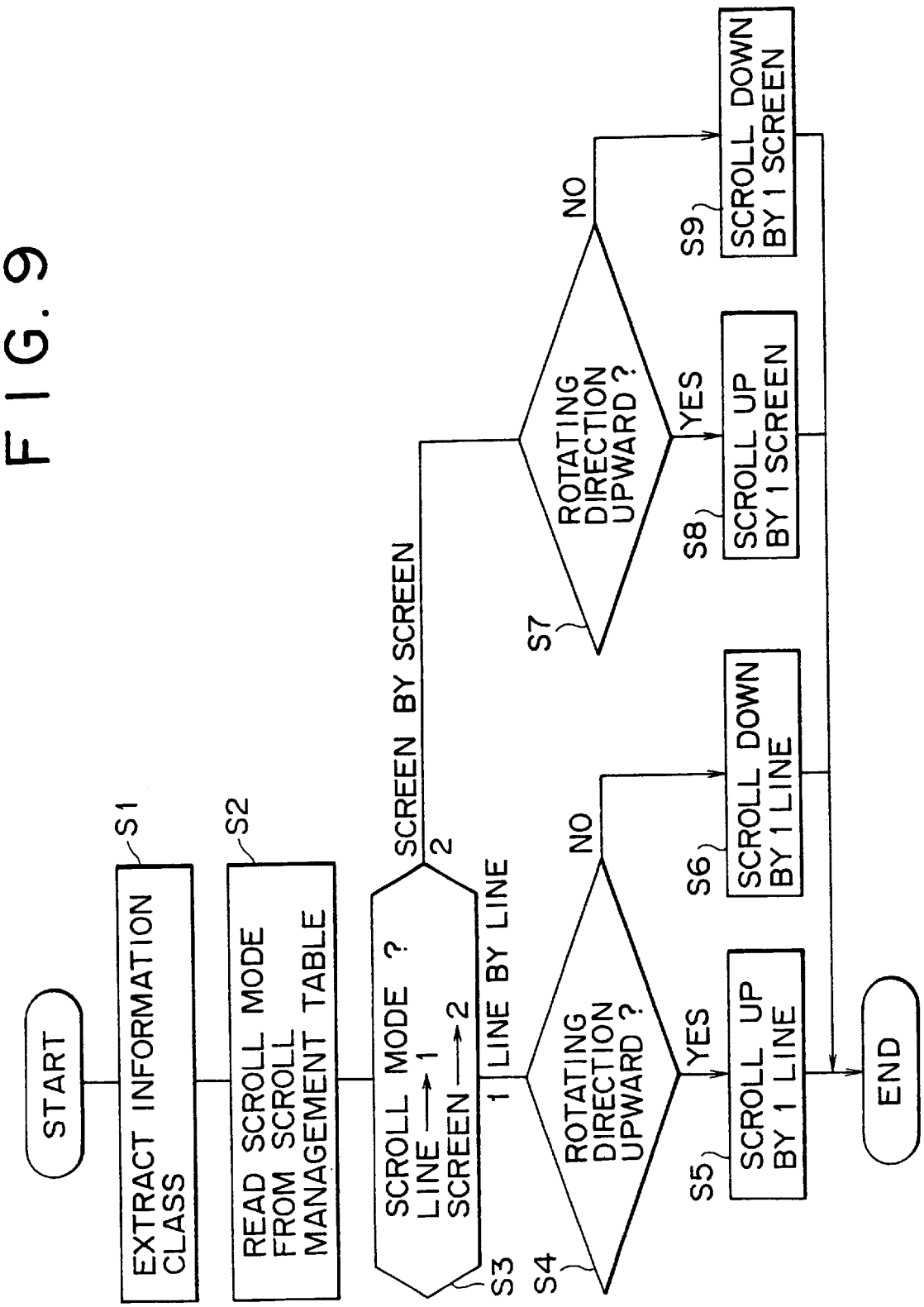
FIG. 9 is a flowchart of steps in which the portable radio information terminal apparatus as the first embodiment operates.

The constitution of the portable radio information terminal apparatus practiced as the first embodiment of this invention has been described above. FIG. 9 is a flowchart of steps in which the first embodiment operates. Described below with reference to FIG. 9 and other figures is how the inventive apparatus works, first when it receives a radio signal and then stores a message carried thereby.

A radio station transmits a radio signal carrying information (message) destined for a specific portable radio information terminal apparatus 1. The apparatus 1 receives the signal by its antenna 2. The receiver 3 submits the signal to such processes as intermediate frequency transformation, amplification and detection. The decoder 4 checks to see if the signal is destined for the own apparatus before decoding the received information signal. When decoded, the information signal is stored into the message memory 7 under control of the CPU 5.

Figure 8:
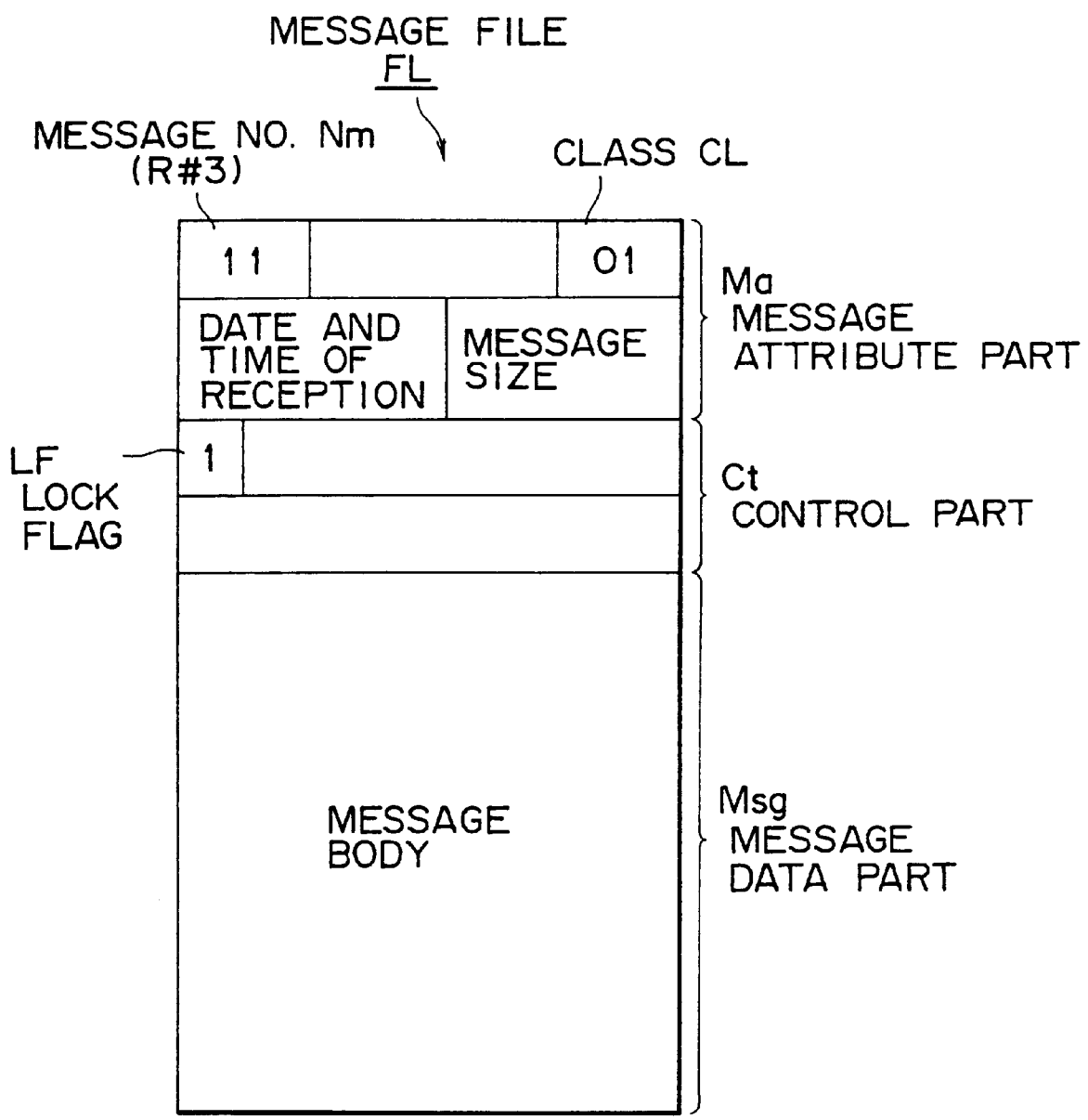
FIG. 8 is an explanatory view illustrating a typical structure of a message file.

For each message, a single message file FL shown in FIG. 8 is created anew. While message files FL each accommodate a message data part Msg holding a message body, a message attribute part Ma containing attribute information about the message in question, and a control part Ct comprising control information are recorded in addition.

The message attribute part Ma includes illustratively a message number Nm, an information class CL of the message in question, a date and time of reception, and a message size. The information class CL is attached to each message at the time of its transmission, and is extracted by the information class extracting means 26 when the message is received (step S1 in FIG. 9).

The information class CL is composed of a code number of messages representing any of different information classes. Such messages are like a type of message sent by individuals, and a type of service message transmitted by information service businesses. The information class CL is referenced in order to verify the unit amount of scroll used to display the message body on the screen.

Illustratively, signals sent by information service businesses, for example, may be associated with a specific information class CL. This class CL may be extracted and written into a message file automatically on the receiving side.

The control part Ct control information comprises illustratively an erase-inhibit flag.

The reception and storage of a message are followed by the alerting a message receipt to the user and the displaying the received message. The CPU 5 controls the portable radio information terminal apparatus 1 in operation in accordance with the control programs held in the system memory 22. First, the CPU 5 checks to see if any information signal has been received. If the receipt of an information signal is ascertained, the CPU 5 activates the display panel driver 11. The display panel driver 11 reads a message made of the received information from a message file in the message memory 7, and causes the LCD panel 12 to display the message illustratively in four lines of 20 alphanumeric characters each.

At the same time, the CPU 5 activates the alarm signal output part 13. In operation, the alarm signal output part 13 inputs an alarm signal to the speaker 14. The speaker 14 sounds, alerting the user to the receipt of the information signal.

The image displaying means of the apparatus is not limited to the LCD panel 12. An LED panel, an organic EL (electroluminescence) panel, or any other suitable image display device may be used alternatively. Furthermore, the screen structure is not limited to the above-mentioned four-line, 20-character-each arrangement. Any other screen structure may be adopted instead.

With the message displayed as described, the screen contents may be scrolled. In the step S2 of FIG. 9, the scroll controlling means 28 reads, from the scroll management table 32, a scroll mode, i.e., a scroll unit corresponding to the information class CL extracted from the message.

In the step S3, a check is made to see whether the retrieved scroll mode (scroll unit) represents a line or a screen. If the scroll unit is found to be a line, in the step S4, the scrolling direction information sent from the scrolling direction detecting means 27 is verified.

If the scrolling direction information reveals the rotary input device 9 to be turned clockwise (for downward scroll), the scroll controlling means 28 activates the line-by-line scrolling means 30 (step S4). The line-by-line scrolling means 30 performs a single line scroll in the downward direction (step S6).

If, in the step S4, the scrolling direction information reveals the rotary input device 9 to be turned counterclockwise (for upward scroll), the scroll controlling means 28 activates the line-by-line scrolling means 30 (step S4). The scrolling means 30 then performs a single line scroll in the upward direction (step S5).

If, in the step S3, the retrieved scroll mode (scroll unit) is found to be a screen, step S7 is reached. In the step S7, a check is made on the scrolling direction information sent from the scrolling direction detecting means 27.

If the scrolling direction information reveals the rotary input device 9 to be turned clockwise (for downward scroll), the scroll controlling means 28 activates the screen-by-screen scrolling means 31 (step S7). The screen-by-screen scrolling means 31 performs a single screen scroll in the downward direction (step S9).

If, in the step S7, the scrolling direction information reveals the rotary input device 9 to be turned counterclockwise (for upward scroll), the scroll controlling means 28 activates the screen-by-screen scrolling means 31 (step S4); the scrolling means 31 performs a single screen scroll in the upward direction (step S8).

As described above, in the first embodiment of the invention, each received message is attached with an information class which is extracted at the time of signal reception. The screen is scrolled in the scroll unit corresponding to the extracted information class. Different types of messages are thus scrolled in their suitable scroll units. Automatically, graphic information in dot patterns is scrolled line by line, and message information in characters is scrolled screen by screen.

Figure 10:
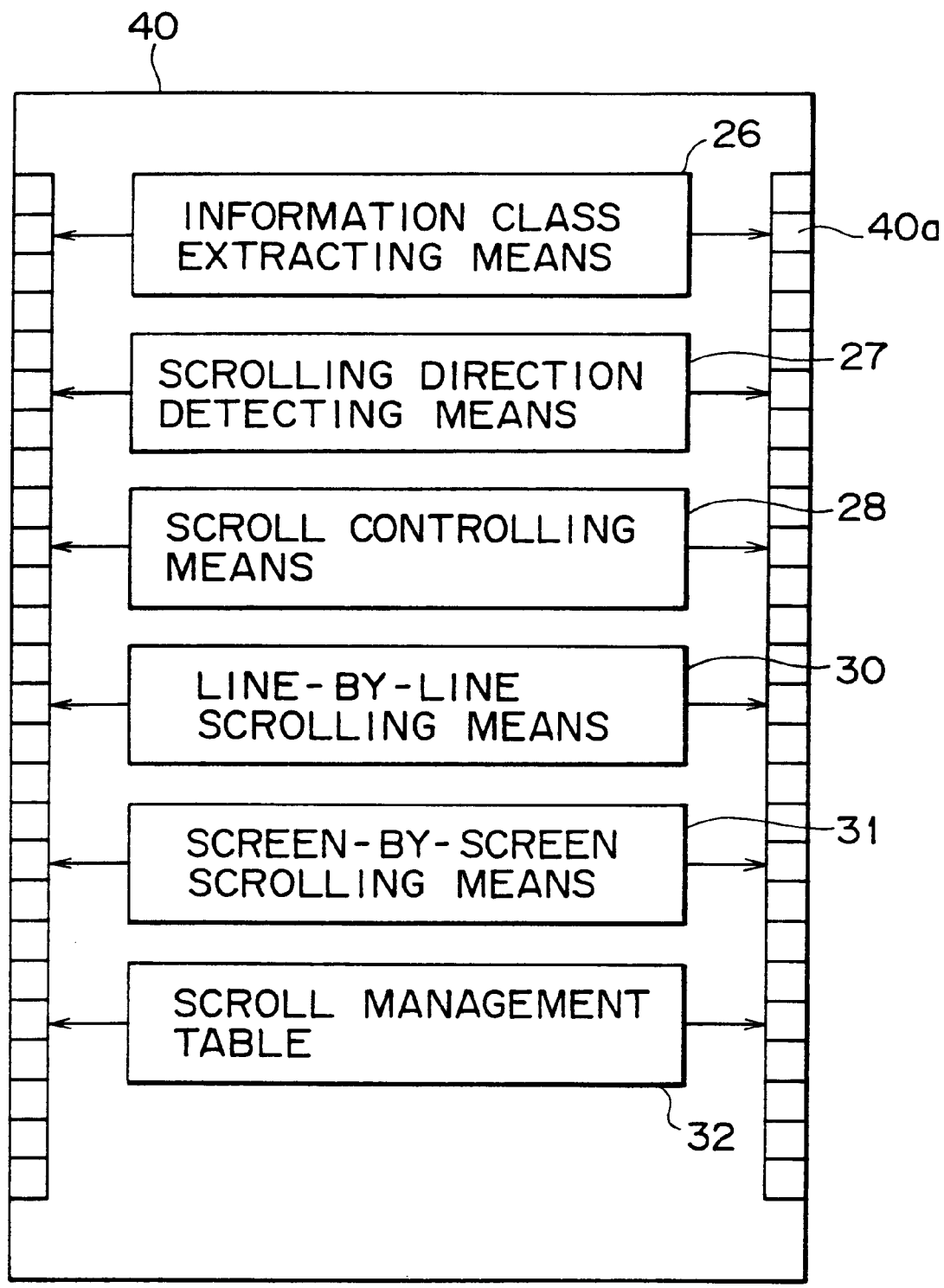
FIG. 10 is an explanatory view depicting a typical structure of a storage medium practiced as a second embodiment of this invention.

FIG. 10 is an explanatory view depicting a typical structure of a storage medium practiced as the second embodiment of this invention. The second embodiment will now be described with reference to FIG. 10.

The storage medium 40 practiced as the second embodiment is a one-chip semiconductor memory. It contains at least six procedures in the form of programs that may be read and executed by a computer. These six means are accessible through a chip terminal 40a.

The first means in the storage medium 40 is the information class extracting means 26. The extracting means 26 is read by a CPU of the computer and executed thereby to extract the information class from the received message.

The second means is the scrolling direction detecting means 27. The detecting means 27 is read by the CPU of the computer and executed thereby to detect a scrolling direction of the screen according to an input signal from an input device.

The third means is the scroll controlling means 28. The controlling means 28 is read by the CPU of the computer and executed thereby to control the line-by-line scrolling means 30 or the screen-by-screen scrolling means 31 with commands according to both the extracted information class designating the unit amount of scroll and the detected scrolling direction. Given the command, the scrolling means 30 or 31 performs scrolling in the extracted scroll unit and in the designated scrolling direction.

The fourth means is the line-by-line scrolling means 30. The scrolling means 30 is read by the CPU of the computer and executed thereby to perform line-by-line scrolling upon receiving a suitable command from the scroll controlling means 28. The line-by-line scrolling means 30 is activated when the scroll unit is turned out to be a line.

The fifth means is the screen-by-screen scrolling means 31. The scrolling means 31 is read by the CPU of the computer and executed thereby to perform screen-by-screen scrolling after receiving an appropriate command from the scroll controlling means 28. The screen-by-screen scrolling means 31 is activated when the scroll unit is found to be a screen.

The sixth means is the scroll management table 32 which is read by the CPU of the computer. This is a table that defines scroll modes and scroll units for different information classes of messages.

The above-described storage medium 40 is incorporated as a memory accommodating CPU operating procedures into a portable radio information terminal apparatus which comprises a CPU, an input device, an image display device and a message memory. The apparatus allows messages coming in on radio waves to be displayed on the screen.

When the storage medium 40 is installed as described above, the means stored therein are executed consecutively by the CPU as the operating procedures. The storage medium 40 thus provides the terminal apparatus with capabilities for extracting an information class from each received signal, detecting a scrolling direction of the received information, ascertaining a scroll unit in which the displayed information is to be scrolled, and performing scrolling in the desired direction and in the designated scroll unit. As such, the second embodiment helps to implement a portable radio information terminal apparatus which offers the varied functions stated above.

The storage medium 40 as the second embodiment of this invention may be practiced in any of such applications as the flash memory, read-only MOS memory, SRAM, EPROM, EEPROM, and all other nonvolatile semiconductor storage media. The second embodiment may also be applied to an optical memory, an optical magnetic memory, and a magnetic memory.

Figure 11:
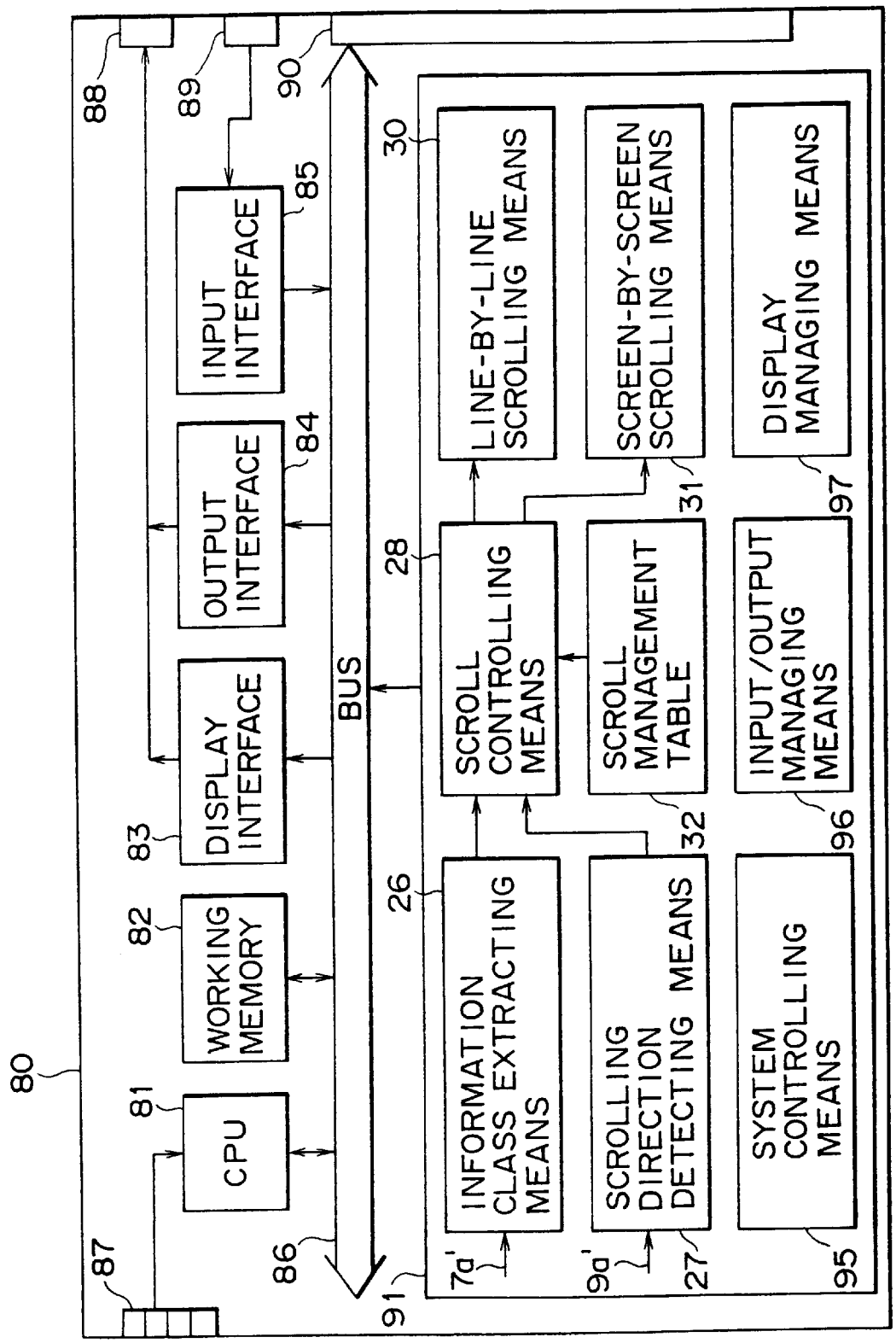
FIG. 11 is a block diagram of an information processing apparatus practiced as a third embodiment of this invention.

FIG. 11 is a block diagram of a microcomputer 80 practiced as the third embodiment of this invention. The third embodiment in the form of a information processing apparatus will now be described with reference to FIG. 11.

The microcomputer 80 constitutes a one-chip information processing apparatus incorporating an internal bus 86. The computer 80 also includes a CPU 81, a working memory 82, a display interface 83, an output interface 84, an input interface 85 and a memory part 91, all connected to the internal bus 86.

The one-chip information processing apparatus has such external terminals as an interrupt input terminal 87 connected to an interrupt input of the CPU 81; an output terminal 88 connected to the display interface 83 and output interface 84; an input terminal 89 connected to the input interface 85; and a common bus terminal 90 connected to the internal bus 86.

The memory part 91 stores program that may be executed by the CPU 81. These programs include system controlling means 95, input/output managing means 96, and display managing means 97. The programs also include the information class extracting means 26, scrolling direction detecting means 27, scroll controlling means 28, line-by-line scrolling means 30, screen-by-screen scrolling means 31, scroll management table 32 and so on.

The system controlling means 95 controls not only the operations of each part of the one-chip microcomputer 80 but also the operations of a part or a whole system which incorporates the microcomputer. The system controlling means 95 is adapted to each particular system that contains the microcomputer 80.

Likewise, the input/output managing means 96 performs management of data and signals exchanged between the one-chip microcomputer 80 and the outside. The input/output managing means 96 also manages the exchanges of data and signals between the system or its part incorporating the microcomputer 80 on the one hand and the outside on the other hand. As such, the input/output managing means 96 is adapted to each particular system that contains the microcomputer 80.

On the other hand, the display managing means 97 manages display operations of an image display device connected externally to the microcomputer 80. The display managing means 97 primarily manages displays of messages and various control icons on the screen.

The information class extracting means 26 is read by the CPU 81 and executed thereby to extract an information class from a received message 7a' when a portable radio information terminal apparatus connected to the microcomputer is in operation. The terminal apparatus comprises an image display device and an input device and should be capable of displaying on a screen the messages carried by incoming radio waves.

The scrolling direction detecting means 27 is read by the CPU 81 and executed thereby to detect a scrolling direction of the screen according to an input signal 9a' coming from an input device.

The scroll controlling means 28 is read by the CPU 81 and executed thereby to control the line-by-line scrolling means 30 or the screen-by-screen scrolling means 31 with commands according to both the extracted information class designating the unit amount of scroll and the detected scrolling direction. Given the command, the scrolling means 30 or 31 performs scrolling in the extracted scroll unit and in the designated scrolling direction.

The line-by-line scrolling means 30 is read by the CPU 81 and executed thereby to perform line-by-line scrolling in receiving a suitable command from the scroll controlling means 28. That is, the line-by-line scrolling means 30 is activated when the designated scroll unit has turned out to be a line.

The screen-by-screen scrolling means 31 is read by the CPU 81 and executed thereby to perform screen-by-screen scrolling in receiving an appropriate command from the scroll controlling means 28. The screen-by-screen scrolling means 31 is activated when the designated scroll unit is found to be a screen.

The scroll management table 32 is read by the CPU 81. This is a table that defines scroll modes and scroll units for different information classes of messages.

The microcomputer 80 is incorporated into a portable radio information terminal apparatus which comprises a communication facility, a received message memory, inputting means, image displaying means, and a power supply circuit.

When installed as described above, the microcomputer 80 provides the terminal apparatus with capabilities for extracting an information class, detecting a scrolling direction, ascertaining a scroll unit for a single scroll operation, and performing scrolling in the determined scroll unit and in the desired direction. Consequently, the third embodiment helps to implement a portable radio information terminal apparatus offering the varied functions stated above.

Figure 12:
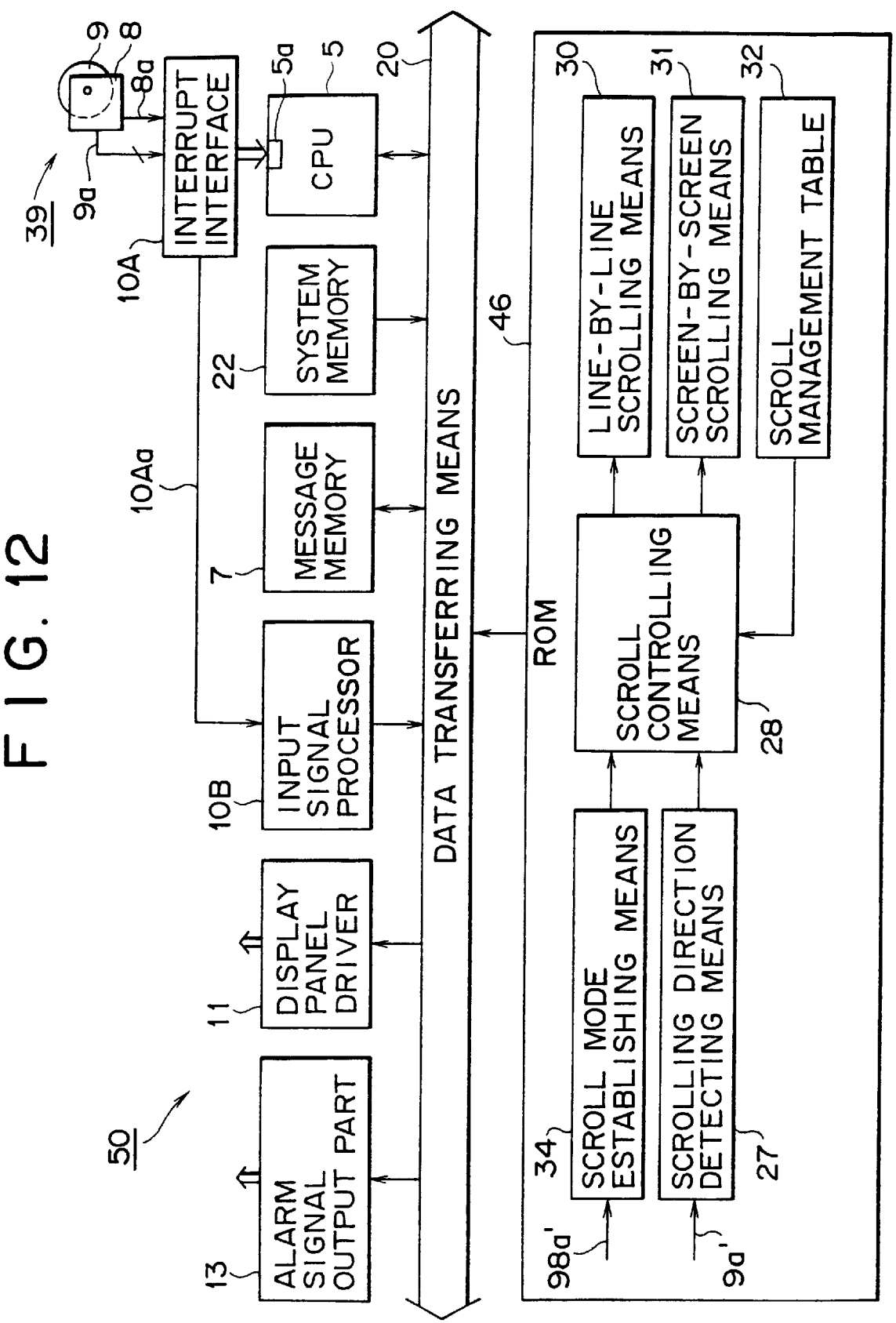
FIG. 12 is a block diagram showing a partial constitution of a portable radio information terminal apparatus practiced as a fourth embodiment of this invention.
Figure 13:
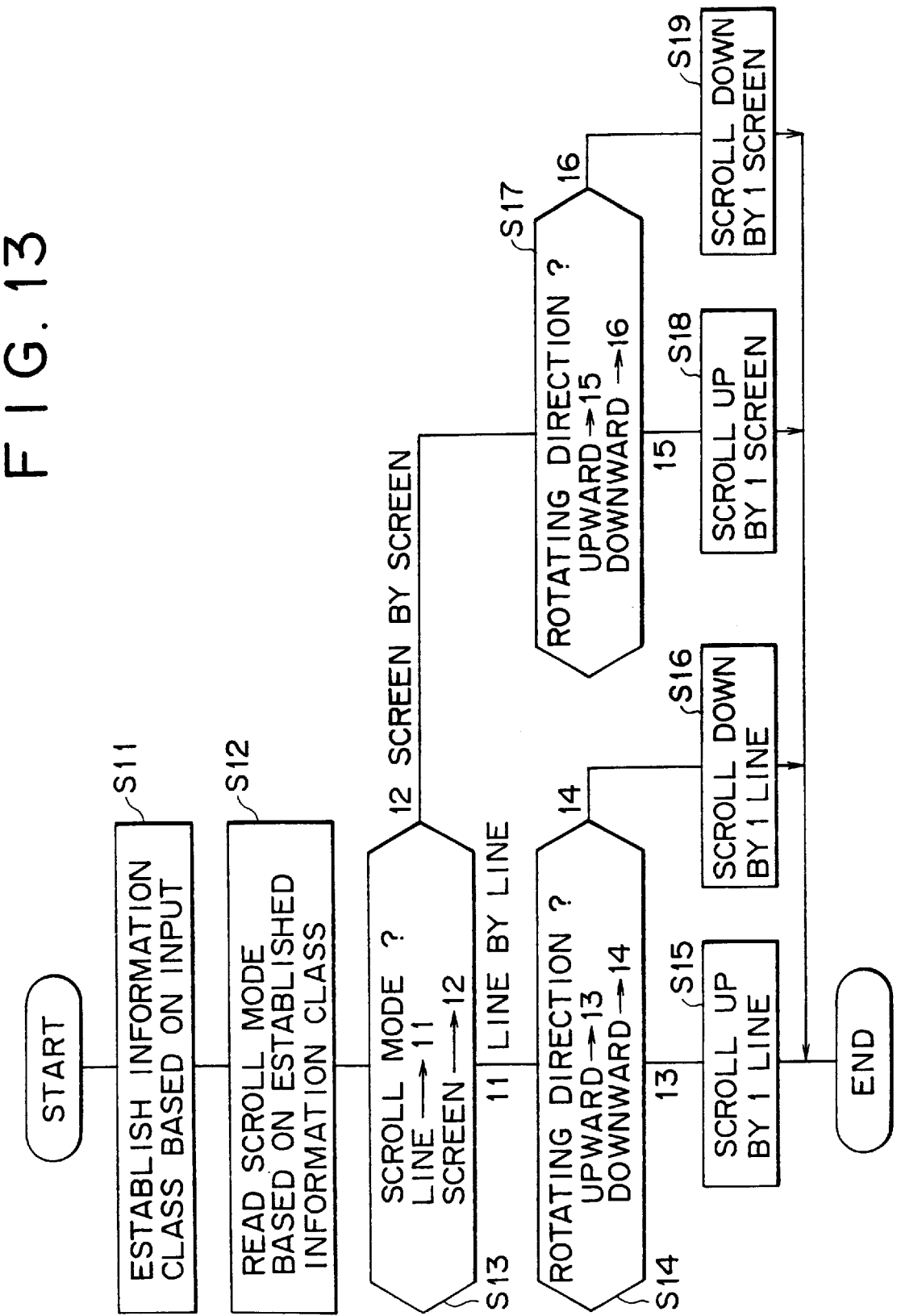
FIG. 13 is a flowchart of steps in which the portable radio information terminal apparatus as the fourth embodiment operates.

FIG. 12 is a block diagram showing a partial constitution of a portable radio information terminal apparatus practiced as the fourth embodiment of this invention. FIG. 13 is a flowchart of steps in which the fourth embodiment operates.

Below is a description of the workings and the constitution of the portable radio information terminal apparatus as the fourth embodiment of the invention. In describing the fourth embodiment, those parts already discussed in connection with the first embodiment are given the same reference numerals, and detailed descriptions of such parts are omitted where they are repetitive.

Data transferring means 20 constitutes a data bus of the portable radio information terminal apparatus 50 embodying the invention. The data bus 20 is connected to a CPU 5, a system memory 22, a ROM 46, a message memory 7, an input signal processor 10B, a display panel driver 11, and an alarm signal output part 13 included in the terminal apparatus 50.

The ROM 46 comprises a read-only MOS memory, a flash memory or the like. The ROM 46 contains, in the form of programs executable by the CPU 5, such means as scroll mode establishing means 34, scrolling direction detecting means 27, scroll controlling means 28, line-by-line scrolling means 30, screen-by-screen scrolling means 31, and a scroll management table 32.

The scroll mode establishing means 34, comprising image displaying means and inputting means, is read by the CPU 5 and executed thereby to establish a scroll mode during an operation of the portable radio information terminal apparatus including image displaying means and inputting means and capable of displaying an image of a received message. The scroll mode establishing means 34 establishes the scroll mode for the image displaying means according to an input signal from the inputting means.

FIG. 13 is a flowchart of steps in which the portable radio information terminal apparatus as the fourth embodiment operates. The workings of the inventive apparatus will now be described with reference to FIG. 13.

In the step S11, the scroll mode establishing means 34 establishes an information class (i.e., scroll mode) according to the input signal. More specifically, the user may perform input operations instructing the fourth embodiment to operate in accordance with an input information class inputted by the portable radio information terminal apparatus. The input operations may be carried out illustratively by pushing in the knob of the rotary/inputting input device 39, rotating the same knob at the same time. These operations cause the rotary input device 9 and pushbutton switch 8 to generate respectively a rotary input signal 9a and a pushed input signal 8a. The two signals are generated at the same time.

The scroll mode establishing means 34 detects the concurrently entered signals 9a and 8a, thereby recognizing the input for establishing an information class and setting the information class CL based on the rotary input signal 9a. This completes establishment of the information class. Subsequent steps are associated with the execution of scrolling.

In the step S12, the scroll controlling means 28 reads from the scroll management table 32, the scroll mode (i.e., scroll unit) corresponding to the information class CL determined in the preceding step.

In the step S13, a check is made to see whether the retrieved scroll mode (scroll unit) is a line or a screen. If the scroll unit is found to be a line, the step S14 is reached in which the scrolling direction information sent from the scrolling direction detecting means 27 is verified.

If the scrolling direction information reveals the rotary input device 9 to be turned clockwise (for downward scroll), the scroll controlling means 28 activates the line-by-line scrolling means 30 (step S14). The scrolling means 30 performs a single line scroll in the downward direction (step S16).

If, in the step S14, the scrolling direction information reveals the rotary input device 9 to be turned counterclockwise (for upward scroll), the scroll controlling means 28 activates the line-by-line scrolling means 30 (step S14); the scrolling means 30 performs a single line scroll in the upward direction (step S15).

If, in the step S13, the retrieved scroll mode (scroll unit) is found to be a screen, the step S17 is reached. In the step S17, a check is made on the scrolling direction information coming from the scrolling direction detecting means 27.

If the scrolling direction information reveals the rotary input device 9 to be turned clockwise (for downward scroll), the scroll controlling means 28 activates the screen-by-screen scrolling means 31 (step S17). The scrolling means 31 performs a single screen scroll in the downward direction (step S19).

On the other hand, if, in the step S17, the scrolling direction information reveals the rotary input device 9 to be turned counterclockwise (for upward scroll), the scroll controlling means 28 activates the screen-by-screen scrolling means 31; the scrolling means 31 performs a single screen scroll in the upward direction (step S18).

As described above, in the fourth embodiment of the invention, the portable radio information terminal apparatus can be set for each received message corresponding to an information class which is inputted by the users. The screen is scrolled in the scroll unit corresponding to the established information class. Consequently, different types of messages are then scrolled in their suitable scroll units. Graphic information in dot patterns is scrolled line by line, and message information in characters is scrolled screen by screen.

Figure 14:
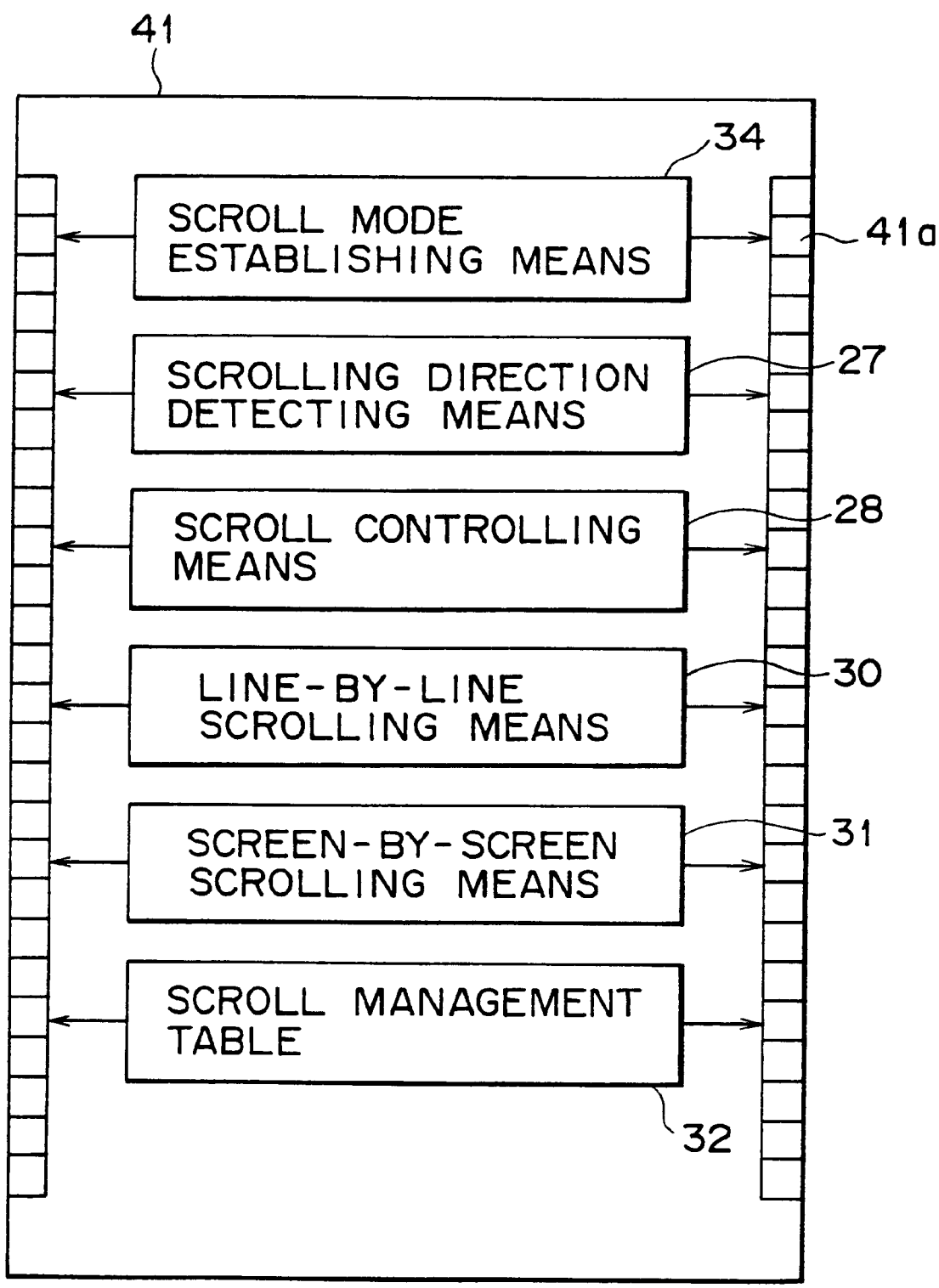
FIG. 14 is an explanatory view depicting a typical structure of a storage medium practiced as a fifth embodiment of this invention.

FIG. 14 is an explanatory view depicting a typical structure of a storage medium practiced as the fifth embodiment of this invention. The fifth embodiment will now be described with reference to FIG. 14. In describing the fifth embodiment, those parts already discussed in connection with the second embodiment are given the same reference numerals, and detailed descriptions of such parts are omitted where they are repetitive.

The storage medium 41 practiced as the fifth embodiment is a one-chip semiconductor memory. It contains at least six procedures in the form of programs that may be read and executed by a computer. These six means are accessible through a chip terminal 41a.

The first means in the storage medium 41 is the scroll mode establishing means 34. The establishing means 34 is read by the CPU of the computer and executed thereby to establish a scroll mode during an operation of the portable radio information terminal apparatus including image displaying means and inputting means and capable of displaying an image of a received message. The apparatus operates to establish the scroll mode for the image displaying means according to the input signal from the inputting means.

The second means is the scrolling direction detecting means 27. The detecting means 27 is read by the CPU of the computer and executed thereby to detect a scrolling direction of the screen according to an input signal from an input device.

The third means is the scroll controlling means 28. The controlling means 28 is read by the CPU of the computer and executed thereby to control the line-by-line scrolling means 30 or the screen-by-screen scrolling means 31 with commands according to both the extracted information class designating the unit amount of scroll and the detected scrolling direction. Given the command, the scrolling means 30 or 31 performs scrolling in the extracted scroll unit and in the designated scrolling direction.

The fourth means is the line-by-line scrolling means 30. The scrolling means 30 is read by the CPU of the computer and executed thereby to perform line-by-line scrolling in receiving a suitable command from the scroll controlling means 28. The line-by-line scrolling means 30 is activated when the scroll unit is turned out to be a line.

The fifth means is the screen-by-screen scrolling means 31. The scrolling means 31 is read by the CPU of the computer and executed thereby to perform screen-by-screen scrolling upon receiving an appropriate command from the scroll controlling means 28. The screen-by-screen scrolling means 31 is activated when the scroll unit is found to be a screen.

The sixth means is the scroll management table 32 that is read by the CPU of the computer. This is a table that defines scroll modes and scroll units for each different information class of messages.

The above-described storage medium 41 is incorporated as a memory accommodating CPU operating procedures into a portable radio information terminal apparatus which comprises a CPU, an input device, an image display device and a message memory. The apparatus should allow messages receiving on radio waves to be displayed on the screen.

When the storage medium 41 is installed as described above, the means stored therein are executed consecutively by the CPU as the operating procedures. The storage medium 41 thus provides the terminal apparatus with capabilities for establishing an information class based on a user input, detecting a scrolling direction, ascertaining a scroll unit for a single scroll operation, and performing scrolling in the desired direction and in the designated scroll unit. The fifth embodiment helps to implement a portable radio information terminal apparatus which offers the varied functions stated above.

The storage medium 41 as the fifth embodiment of this invention may be practiced in any of such applications as the flash memory, read-only MOS memory, SRAM, EPROM, EEPROM, and all other nonvolatile semiconductor storage media. The fifth embodiment may also be applied to an optical memory, an optical magnetic memory, and a magnetic memory.

FIG. 15 is a block diagram of a microcomputer 100 practiced as the sixth embodiment of this invention. The sixth embodiment in the form of a microcomputer will now be described with reference to FIG. 15. In describing the sixth embodiment, those parts already discussed related to the third embodiment are given the same reference numerals, and detailed descriptions of such parts are omitted where they are repetitive.

The microcomputer 100 constitutes a one-chip microcomputer incorporating an internal bus 86. The computer 100 also includes a CPU 81, a working memory 82, a display interface 83, an output interface 84, an input interface 85 and a memory part 92, all connected to the internal bus 86.

The one-chip microcomputer has such external terminals as an interrupt input terminal 87 connected to an interrupt input of the CPU 81; an output terminal 88 connected to the display interface 83 and output interface 84; an input terminal 89 connected to the input interface 85; and a common bus terminal 90 connected to the internal bus 86.

Further, the memory part 92 stores program that may be executed by the CPU 81. These programs include system controlling means 95, input/output managing means 96, and display managing means 97. The programs also include the scroll mode establishing means 34, scrolling direction detecting means 27, scroll controlling means 28, line-by-line scrolling means 30, screen-by-screen scrolling means 31, scroll management table 32, and so on.

The system controlling means 95, input/output managing means 96, display managing means 97, scrolling direction detecting means 27, scroll controlling means 28, line-by-line scrolling means 30, screen-by-screen scrolling means 31, and scroll management table 32 are the same as those included in the third embodiment.

The scroll mode establishing means 34 is read by the CPU 81 and executed thereby to establish a scroll mode during an operation of the portable radio information terminal apparatus including image displaying means and inputting means and capable of displaying an image of a message carried by incoming radio waves. The apparatus establishes an information class and a scroll mode for the image displaying means according to the input signal from the inputting means during its operation.

The microcomputer 100 may be incorporated into a portable radio information terminal apparatus which comprises a communication facility, a received message memory, inputting means, image displaying means, a power supply circuit and so on.

When the above microcomputer 100 is installed as described above, the stored means are carried out consecutively. The microcomputer 100 thus provides the terminal apparatus with functions of establishing a scroll mode according to an input signal, detecting a scrolling direction, ascertaining a scroll unit for a single scroll operation, and performing scrolling in the desired direction and in the designated scroll unit. As a result, the sixth embodiment helps to implement a portable radio information terminal apparatus which offers the varied functions stated above.

As many apparently different embodiments of this invention may be made without departing from the sprit and scope thereof, it is to be understood that the invention is not limited to the specific embodiments thereof except as defined in the appended claims.

What is claimed is:

1. A screen operating method for use with a portable radio information terminal apparatus which displays on a screen a message received on radio waves and which has inputting means and image displaying means, said method comprising the steps of:

establishing a scroll unit as a unit amount by which to effect a single scroll operation in accordance with an information class attached to the received message;

establishing a scrolling direction according to an input command; and performing scrolling in the scroll unit and in the scrolling direction.

2. The screen operating method according to claim 1, further comprising the step of generating, from a rotary input device of said inputting means, two kinds of input signals when a rotating part of said rotary input device is rotated clockwise and counterclockwise.

3. A portable radio information terminal apparatus, capable of displaying on a screen a message received on radio waves, comprising:

inputting means;

image displaying means;

information class extraction means for extracting an information class attached to the received message;

scrolling direction detecting means for detecting a scrolling direction on a screen of said image displaying means according to an input signal from said inputting means; and scroll controlling means for controlling scrolling in the scrolling direction detected by the scrolling direction detecting means and in a scroll unit established as a unit amount by which to effect a single scroll operation corresponding to the information class extracted by the information class extraction means.

4. The portable radio information terminal apparatus according to claim 3, wherein said inputting means includes a rotary input device capable of generating two kinds of input signals when a rotating part of said rotary input device is rotated clockwise and counterclockwise.

5. A storage medium for use with a portable radio information terminal apparatus which has an inputting device and an image displaying device and which is capable of displaying on a screen a message received on radio waves, wherein said storage medium stores programs to be read and executed by a computer, said storage medium including:

information class extracting means for extracting an information class attached to the received message; scrolling direction detecting means for detecting a scrolling direction according to an input signal from said inputting device; and scroll controlling means for controlling scrolling in the scrolling direction detected by the scrolling direction detecting means and in a scroll unit established as a unit amount by which to effect a single scroll operation corresponding to the information class extracted by the information class extracting means.

6. An information processing apparatus for use with a portable radio information terminal apparatus having inputting means and image displaying means and being capable of displaying on a screen a message received over radio waves, said information processing apparatus comprising:

a central processing unit;

a storage part for storing programs which may be read and executed by said central processing unit; and a data transfer part connected to said central processing unit and to said storage part and which may be connected from an external device, whereby signals representing results of processing by said central processing unit are transferred to said external device using one of a wired fashion and by radio waves; and wherein said storage part stores the programs which may be read and executed by said central processing unit during an operation of said portable radio information terminal apparatus, said programs including information class extracting means for extracting an information class attached to the received message, scrolling direction detecting means for detecting a scrolling direction based on an input signal from said inputting means, and scroll controlling means for controlling scrolling in the scrolling direction detected by said scrolling direction detecting means and in a scroll unit established as a unit amount by which to effect a single scroll operation corresponding to the information class extracted by the information class extracting means.

* * * * *